United States Patent [19]
Sammells

[11] Patent Number: 4,920,015
[45] Date of Patent: Apr. 24, 1990

[54] ELECTROCHEMICAL H₂S CONVERSION

[75] Inventor: Anthony F. Sammells, Naperville, Ill.

[73] Assignee: Gas Research Institute, Chicago, Ill.

[21] Appl. No.: 250,940

[22] Filed: Sep. 29, 1988

[51] Int. Cl.⁵ .............................................. H01H 8/06
[52] U.S. Cl. ..................................... 429/17; 429/19; 429/33; 429/40; 429/34; 423/573.1
[58] Field of Search ........................ 429/17, 19, 20, 21, 429/30, 34, 33, 40; 423/242, 244, 248, 563, 564, 511, 567 R, 571, 573.1

[56] References Cited

U.S. PATENT DOCUMENTS

| | | |
|---|---|---|
| 3,972,988 | 8/1976 | Urban ................................ 423/571 |
| 4,363,790 | 12/1982 | Anderson et al. ........... 423/573.1 X |
| 4,443,424 | 4/1984 | Olson ............................. 423/573 G |

OTHER PUBLICATIONS

Kirk–Othmer Encyclopedia of Chemical Technology, vol. 22, pp. 276–293, Sulfur Recovery.
Kameyama, T., M. Dokiya, F. Fujishige, H. Kokokwawa and F. Fukuda, Int. J. Hydrogen Energy, "Production of Hydrogen from Hydrogen Sulfide by Means of Selective Diffusion Membranes", 8, 5–13 (1983).
Kalina, D. W., E. T. Mass, Jr., Int. J. Hydrogen Energy, "Indirect Hydrogen Sulfide Conversion"—I. An Acidic Electrochemical Process: 10, 157–162 (1985).
Kalina, D. W., E. T. Mass, Jr., Int. J. Hydrogen Energy, "Indirect Hydrogen Sulfide Conversion"—II, A Basic Electrochemical Process, 10, 163–167 (1985).
Sammells, A. F., S. B. Nicholson and P. G. P. Ang, J. Electrochem. Socl, "Development of Sulfur–Tolerant Components for the Molten Carbonate Fuel Cell", 127, 350–357, (1980).
Fuel Cell Technology Status Report, DOW/MET-C-86/0241, Morgantown Energy Technology Center (1985).
Ong, G. G., T. A. Lin and D. M. Mason, Abstract #531, "The Anodic Oxidation of H₂ and H₂S on Yttria–Stabilized Zirconia (YSZ) with Porous Au, Ni, or Pt Metal Electrodes", Electrochem. Soc. Meeting, Philadelphia, Pa., May 1987.
Lim, H. S. and J. Winnick, J. Electrochem. Soc., "Electrochemical Removal and Concentration of Hydrogen Sulfide from Coal Gas", 131, 562–568 (1984).

*Primary Examiner*—Anthony Skapars
*Attorney, Agent, or Firm*—Thomas W. Speckman

[57] ABSTRACT

A solid oxide fuel cell having an electrocatalytic anode of $A_{1+x}B_{2-x}S_4$ thiospinel wherein A and B are metallic, $0<x<0.2$ and S is sulfur, thermally stable at cell operating temperatures of about 650° to about 1050° C. is in contact with one side of a solid oxygen ion conducting electrolyte. A cathode of strontium doped lanthanum manganite is in contact with the opposite side of the solid electrolyte. When H₂S containing gas is passed in contact with the electrocatalytic anode and O₂ containing gas passed in contact with the cathode, the H₂S is spontaneously reduced to S and H₂O at the electrocatalytic anode and an electric current is produced.

29 Claims, 1 Drawing Sheet

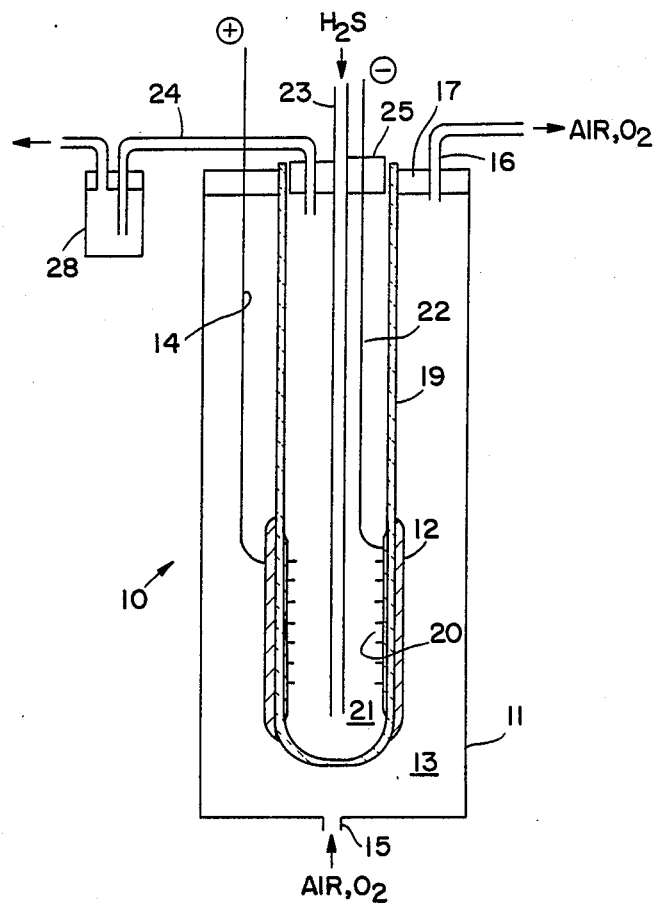

ELECTROCHEMICAL H₂S CONVERSION

BACKGROUND OF THE INVENTION

1. Field of the Invention

This invention relates to electrochemical $H_2S$ spontaneous conversion to S and $H_2O$ with the concurrent production of electrical energy. The electrochemical $H_2S$ conversion is suitable to a wide variety of $H_2S$ containing gas cleanup processes, such as in gasification and liquefaction of naturally occurring carbonaceous materials.

2. Description of the Prior Art

Large quantities of $H_2S$ are generated in gasification and liquefaction of naturally occurring carbonaceous materials, such as coal, and in heavy oil desulfurization. Typically, $H_2S$ is removed from product streams by absorption of $H_2S$ in a solvent and the dissolved $H_2S$ stripped from the solvent. The $H_2S$ is generally then subjected to an oxidation process to form elemental sulfur and water. The Claus process is a well known, commonly used industrial process for the chemical conversion of $H_2S$ to elemental sulfur. However, due to stringent air pollution regulations currently in effect, $SO_2$ containing tail-gases must be further treated to reduce or eliminate the sulfur content of the gas entering the atmosphere as taught by Kirk-Othmer Encyclopedia of Chemical Technology, Vol. 22, pgs. 276-293, Sulfur Recovery. The Claus process results in heat available for other uses.

The thermal dissociation of $H_2S$ in the presence of a suitable catalyst and separation of hydrogen by selective ceramic diffusion membranes is taught by Kameyama, T., M. Dokiya, F. Fujishige, H. Yokokwawa and F. Fukuda, Int. J. Hydrogen Energy, "Production of Hydrogen from Hydrogen Sulfide by Means of Selective Diffusion Membranes", 8, 5-13 (1983).

Indirect $H_2S$ conversion to elemental S in electrochemical cells requiring electric energy input is described in Kalina, D. W., E. T. Maas, Jr., Int. J. Hydrogen Energy, "Indirect Hydrogen Sulfide Conversion - I. An Acidic Electrochemical Process", 10, 157-162 (1985); and Kalina, D. W., E. T. Maas, Jr., Int. J. Hydrogen Energy, "Indirect Hydrogen Sulfide Conversion - II. A Basic Electrochemical Process", 10, 163-167 (1985).

In addition to being an undesired atmospheric pollutant, the presence of $H_2S$ has been found to result in degradation of electrochemical performance of fuel cells, including molten carbonate fuel cells as taught by Sammells, A. F., S. B. Nicholson and P. G. P. Ang, J. Electrochem. Soc., "Development of Sulfur-Tolerant Components for the Molten Carbonate Fuel Cell", 127, 350-357, (1980), and solid oxide fuel cells as taught by Fuel Cells Technology Status Report, DOW/METC-86/0241, Morgantown Energy Technology Center (1985).

The anodic oxidation of $H_2$ and $H_2S$ on yttria stabilized zirconia solid oxide electrolytes using Au, Pt or Ni electrodes wherein current darkened electrolyte produces trapped electrons or colored F-centers in the electrolyte which act as active electrocatalytic sites for the $H_2S$ oxidation with the electrode playing an insignificant role in the catalytic process is taught by Ong, B. G., T. A. Lin and D. M. Mason, Abstract #531, "The Anodic Oxidation of $H_2$ and $H_2S$ on Yttria-Stabilized Zirconia (YSZ) with Porous Au, Ni, or Pt Metal Electrodes", Electrochem. Soc. Meeting, Philadelphia, Pa., May (1987).

Electrochemical membrane cells have been suggested for removal of $H_2S$ from a hot gas stream. High temperature molten sulfide electrolytes with porous carbon electrodes provide that the process gas pass through the cathode chamber selectively removing $H_2S$ and with passage of current, the anion migrates to the anode where elemental sulfur is removed are taught by Lim, H. S. and J. Winnick, J. Electrochem. Soc., "Electrochemical Removal and Concentration of Hydrogen Sulfide from Coal Gas", 131, 562-568 (1984).

SUMMARY OF THE INVENTION

This invention relates to a process and apparatus for electrochemical $H_2S$ spontaneous conversion to elemental sulfur.

It is an object of this invention to provide a process and apparatus for electrochemical $H_2S$ conversion to S in a solid electrolyte fuel cell with the concurrent production of electricity.

It is a further object of this invention to provide a process and apparatus for electrochemical $H_2S$ conversion to S which may be carried out at temperatures approximating those of product gases from processes for gasification and liquefaction of naturally occurring carbonaceous materials.

It is yet another object of this invention to provide a process and apparatus for electrochemical $H_2S$ conversion to S to provide sufficiently sulfur-free fuels for use in other fuel cells, such as molten carbonate and solid oxide fuel cells.

It is still another object of this invention to provide a process and apparatus for electrochemical $H_2S$ conversion to S providing high efficiency conversions to significantly reduce or eliminate tail gas cleanup of currently used sulfur removal processes.

The above objects and other advantages of this invention are achieved by the electrochemical spontaneous conversion of hydrogen sulfide by passing $H_2S$ containing gas in contact with an electrocatalytic anode comprising an $AB_2S_4$ thiospinel, wherein A and B are metallic and S is sulfur, thermally stable at cell operating temperatures of about 650° to about 1050° C. and passing $O_2$ containing gas in contact with a cathode comprising strontium doped lanthanum manganite forming ionic oxygen which is passed from the cathode through a solid oxygen ion conducting electrolyte to the anode where the $H_2S$ is oxidized to S and $H_2O$ at the electrocatalytic anode with the concurrent production of electricity.

The fuel cell of this invention may have any suitable fuel cell physical configuration as known to the art for single cells or for stacks of cells. An anode collector of any electron conducting metal stable in the fuel cell operating environment is in electronic contact with an electrocatalytic $AB_2S_4$ thiospinel thermally stable at cell operating temperatures of about 650° to 1050° C. Included as suitable thiospinels are non-stoichiometric thiospinels having the formulation $A_{1+x}B_{2-x}S_4$ where $0<X<0.2$, which terminology will be used herein to denote both stoichiometric and non-stoichiometric thiospinels. Suitable $AB_2S_4$ thiospinels include those taught by Bouchard, R. J., P. A. Russo and A. Wold, Inorg. Chem., 4, 685 (1965), which is incorporated herein in its entirety by reference. $A_{1+x}B_{2-x}S_4$ thiospinels suitable for use in this invention include those in which A is Cu, Ni, Mn, Co, Fe, Zn, and mixtures thereof and B is different from A and is Co, Ni, Fe, V, Ti, and mixtures thereof. Preferred thiospinels include those wherein A is Cu, Ni, and mixtures thereof, and B is different from A and is Ni, Co, Fe, and mixtures thereof. Preferred anode current collectors are tungsten and tungsten containing alloys. In contact with the anode is one side of a solid oxygen ion conducting electrolyte, such as zirconia stabilized into cubic form providing high oxygen ion conductivity. Adjacent the opposite side of the solid electrolyte is a strontium doped lanthanum manganite cathode, such as ($La_{0.89}Sr_{0.11}MnO_3$) in contact with a cathode collector, suitably platinum in a single cell and magnesium doped lanthanum chromite interconnect material in a stacked cell configuration.

BRIEF DESCRIPTION OF THE DRAWING

The above objects and advantages of this invention will become more clear upon reading preferred embodiments of the invention and by reference to the drawing wherein the figure is a stylized drawing of one embodiment of a fuel cell according to this invention.

DESCRIPTION OF PREFERRED EMBODIMENTS

Referring to the figure, fuel cell 10 is shown with cathode compartment container 11 having cathode compartment inlet 15 for introduction of oxygen-containing gas such as air and cathode compartment outlet 16. Solid electrolyte 19 is in the form of a tube closed at one end in sealed relation within cathode compartment container 11. Other shapes of the solid electrolyte are suitable for stacked cells or for special design purposes. Suitable materials for the solid electrolyte are oxygen ion conducting materials stabilized into cubic form providing high oxygen ion conductivity. Suitable oxygen conducting solid electrolytes include $ZrO_2$ stabilized with ($8^{m/o}$ $Y_2O_3$), ($15^{m/o}$ CaO), ($15-20^{m/o}$ MgO), ($5-15^{m/o}$ $La_2O_3$), ($15^{m/o}$ $Nd_2O_3$), ($10^{m/o}$ $Sm_2O_3$), ($10^{m/o}$ $Gd_2O_3$), ($9^{m/o}$ $Yb_2O_3$), ($15^{m/o}$ $Lu_2O_3$), ($10^{m/o}$ $Sc_2O_3$) or ($12.7^{m/o}$ $Ho_2O_3$); $ThO_2$ stabilized with ($7^{m/o}$ CaO) or ($15^{m/o}$ $YO_{1.5}$); $CeO_2$ stabilized with ($10^{m/o}$ CaO) or ($5^{m/o}$ $Y_2O_3$); $Bi_2O_3$ stabilized with ($25^{m/o}$ $Y_2O_3$), ($28.5^{m/o}$ $Dy_2O_3$), ($20^{m/o}$ $Er_2O_3$), ($35^{m/o}$ $Yb_2O_3$), or ($35^{m/o}$ $Gd_2O_3$). A preferred oxygen ion conducting solid electrolyte is $ZrO_2(8^{w/o}Y_2O_3)$. Adjacent one side of the solid electrolyte and in intimate contact with the solid electrolyte is cathode 12 which is strontium doped lanthanum manganite. The cathode is preferably $La_{1-31 x}Sr_xMnO_3$ wherein $0.1 < x < 0.2$. In intimate electrical contact with cathode 12 is current collector and its lead 14 for conduct of electrons to provide electronic balance of the cell and withdrawal of electricity. Suitable cathode current collectors for single cells include platinum, platinum alloys, magnesium doped lanthanum chromite and electron conducting ceramics, such as silicon carbide, titanium carbide and niobium doped titanium dioxide. When stacked cells are used, interconnect material such as magnesium doped lanthanum chromite is suitable, such as $Mg_xLa_{1-x}CrO_3$ wherein $0.05 < x < 0.2$, preferably $Mg_{0.05}La_{0.95}CrO_3$. Anode 20 is located on the opposite surface of solid electrolyte 19, opposite cathode 12, and is suitably any $AB_2S_4$ thiospinel thermally stable at cell operating temperatures of about 650° to about 1050° C. Preferred thiospinels include those having A equal Cu, Ni, and mixtures thereof, and B equal Ni, Co, Fe, and mixtures thereof having the formula $A_{1+x}B_{2-x}S_4$. Particularly preferred is $CuFe_2S_4$. Anode 20 is in electrical contact with its current collector and current collector lead 22 which is suitably any electron conducting metal stable in the fuel cell operating environment, preferably, tungsten and tungsten containing alloys. The cathode and the anode materials may be applied to the solid electrolyte by means known in the art and by means specifically set forth in this application.

The cathode compartment 13 is closed by cathode compartment cover 17 to provide a closed volume for oxygen containing gas to be passed inwardly through inlet 15 and flow in contact with cathode 12 and out of the cathode chamber through cathode compartment outlet 16. The anode compartment 21 is provided with cover 25 with anode compartment inlet 23 and anode compartment outlet 24. Anode compartment inlet 23 extends to the lowermost region of anode 20 so that $H_2S$ may be introduced in proximity to and flow in contact with anode 20 with vaporous S and $H_2O$ leaving the anode compartment through outlet 24. The products from anode compartment 21 may be passed through sulfur condenser 28 to separate sulfur. Any type of condenser known to the art to be suitable for condensation at the desired temperatures may be used to separate sulfur.

Produced electricity withdrawn from fuel cell 10 through cathode current collector lead 14 and anode current collector lead 22 may be stored or used directly as is well known in the art.

The thiospinels may be prepared in situ at the anode from initially deposited oxide spinels having the formula $A_{1+x}B_{2-x}O_4$ by the overall reaction:

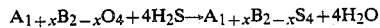

$$A_{1+x}B_{2-x}O_4 + 4H_2S \rightarrow A_{1+x}B_{2-x}S_4 + 4H_2O$$

Thus, internally reformed methane fuel cells using fuel containing significant concentrations of $H_2S$ and having oxide spinel anodes may reach an equilibrium shown the above reaction which provides fuel cell sulfur tolerance.

The process for electrochemical $H_2S$ conversion according to this invention comprises passing $H_2S$ containing gas in contact with an electrocatalytic anode comprising $A_{1+x}B_{2-x}S_4$ thiospinel thermally stable at cell operating temperatures of about 650° to about 1050° C., preferably about 800° to about 1000° C.; passing $O_2$ containing gas in contact with a cathode comprising strontium doped lanthanum manganite to form ionic oxygen; passing the formed ionic oxygen from the cathode through a solid oxygen ion conducting electrolyte, preferably comprising zirconia stabilized into cubic form, to the anode adjacent the opposite side of the solid electrolyte where the $H_2S$ is oxidized to S and $H_2O$ at the electrocatalytic anode. During the process, an electric current is produced and may be withdrawn from the cell.

While the exact electrochemical reactions are not known and the inventor does not wish to be bound by the following reaction scheme, there is evidence that the electrochemical oxidation according to the present invention may proceed as described. The Claus process takes place by the following overall reactions:

$$2H_2S + 3O_2 \rightarrow 2SO_2 + 2H_2O \qquad (1)$$

$$2H_2S + SO_2 \rightarrow 3S + 2H_2O \qquad (2)$$

As shown by Example II below, the fuel cell according to this invention, operated at 900° C., had an open circuit potential of 1.04 volts with currents in excess of 100mA being delivered. This is in contrast to the theoretical open circuit potential for the overall reaction:

$$H_2S + 3/2 O_2 \rightarrow SO_2 + H_2O \tag{3}$$

which at 900° would be 0.56 volts. The direct electrochemical reaction:

$$H_2S + 1/2 O_2 \rightarrow S + H_2O \tag{4}$$

at cell operating temperatures of 900° C. would be expected to have a theoretical open cell potential of 0.26 volts. One route for the process of this invention may be thermal dissociation of $H_2S$ at the thiospinel anode prior to electrochemical reaction according to:

$$H_2S \rightarrow H_2 + S \tag{5}$$

$$8 H_2S \rightarrow 8 H_2 + S_8 \tag{6}$$

$$2 H_2S \rightarrow 2 H_2 + S_2 \tag{7}$$

Hydrogen produced adjacent the thiospinel/solid electrolyte interface would then become electrochemically available for oxidation by the overall electrochemical reaction:

$$H_2 + 1/2 O_2 \rightarrow H_2O \tag{8}$$

and sulfur produced may be oxidized by the electrochemical reaction:

$$S + O_2 \rightarrow SO_2 \tag{9}$$

which has an open cell potential of 0.97 volts at the cell operating temperature of 900° C. The observed open circuit potential of 1.04 volt may be explained by a mixed potential based upon contributions from electrochemical cell reactions (8) and (9). $SO_2$ formed in the anode compartment from reaction (9) would then be available to promote reaction (2) in the fuel cell anode compartment at the cell operating temperatures. Under these circumstances, $H_2S$ input flow conditions to the fuel cell anode compartment should be adjusted so that the residual $H_2S/SO_2$ ratio after electrochemical reaction is about 2:1 so that the reaction of equation (2) may proceed with high efficiency. It is presently believed that the kinetics for reaction (8) are much more rapid than those of reaction (9) generally.

The following examples set forth specific embodiments in detail and are meant to exemplify the invention and not to limit it in any way.

EXAMPLE I

A fuel cell assembly was fabricated using a yttria stabilized zirconia tube of the general configuration shown in FIG. 1 closed at one end, $ZrO_2(8^{w/o} Y_2O_3)$ (Corning, OD 0.9 cm, ID 0.6 cm) resulting in a solid electrolyte thickness of 0.15 cm. A 0.25 mm platinum wire current collector was tightly coiled around the exterior of the lower closed end of the tube. The oxygen reduction electrode (cathode) electrocatalyst material was applied to the exterior of the lower closed end of the tube over the platinum wire as a $5^{w/o}$ suspension in ethylene glycol/citric acid of $La(C_2H_3O_2)$, $SrCO_3$ and $MnCO_3$ of proportions to result in $La_{0.89}Sr_{0.11}MnO_3$.

The tube assembly was heated to 800° C. in air and maintained for one hour followed immediately by heating to 1250° C. for one hour to form the thin layer $La_{0.89}Sr_{0.11}MnO_3$ electrocatalyst of the oxygen electrode. Good adhesion was found between the sintered oxygen electrode, cathode, the solid electrolyte tube and the platinum current collector.

The thiospinel $CuFe_2S_4$ was prepared by direct chemical reaction by intimately mixing in an ampoule stoichiometric quantities of finely dispersed powdered elements having purities greater than 99.9 percent. The ampoule was sealed and the solid-state reaction mixture slowly heated to and maintained at 700° C. for three days to promote the reaction. The resulting black crystalline product $CuFe_2S_4$ possessed good electronic conductivity.

The thiospinel electrocatalyst used at the anode was prepared into a paste by adding 1 gram $CuFe_2S_4$ of less than 325 mesh, 0.1 gram carbowax 1000 (Alltech) and 3 to 4 drops of water. A coiled tungsten wire current collector, 0.25 mm diameter, 99.9 percent pure, (Aldrich) was introduced into the lower 5 cm of the solid electrolyte tube maximizing its initial superficial mechanical contact to the inside wall. The thiospinel containing paste was painted over the coiled tungsten current collector region ensuring that contact was achieved both to the tungsten current collector and the solid electrolyte. The thiospinel electrocatalyst was cured under Argon gas for one hour at 100° C. for water removal, followed by one hour at 200° C. for carbowax 1000 removal, and followed by one hour at 800° C. for removal of residual volatiles. The geometric area of the thiospinel anode was not measured, but was less than 10 cm$^2$.

The fuel cell assembly of the fuel cell having the configuration shown below was then ready for use:

$$W/CuFe_2S_4/ZrO_2(8^{w/o} Y_2O_2)/La_{0.89}Sr_{0.11}MnO_3/Pt$$

EXAMPLE II

The solid oxide fuel cell described in Example I was used by introducing $H_2S$ (Matheson 99.5 percent) into the anode compartment at 900° C. via an alumina tube whose outlet was in close proximity to the thiospinel electrocatalyst anode. Air was passed over the cathode region providing $O_2$. The initial fuel cell open circuit potential became 1.04 volt. The overall cell resistance of about 10 ohms was dominated by that of the solid electrolyte. The fuel cell may be described as the following:

$$H_2S, W/CuFe_2S_4/ZrO_2(8^{w/o} Y_2O_2)/La_{0.89}Sr_{0.11}MnO_3/Pt, O_2(air)$$

The current potential measurements for this cell and the projected IR free cell performance are shown in Table I:

TABLE I

| | Cell Potential (V) | |
|---|---|---|
| Cell Current (mA) | Measured | Projected IR Free |
| 5 | 1.04 | 1.04 |
| 12 | 0.95 | 1.02 |
| 20 | 0.88 | 1.00 |
| 37 | 0.70 | 0.99 |

TABLE I-continued

| Cell Current (mA) | Cell Potential (V) | |
|---|---|---|
| | Measured | Projected IR Free |
| 53 | 0.55 | 0.98 |

The thiospinel appeared to possess good stability in this cell.

The fuel cells used in the above Examples represent preliminary laboratory fuel cells and when such fuel cells are optimized one would anticipate current densities several magnitudes greater would be obtained.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for electrochemical $H_2S$ conversion comprising:
   passing $H_2S$ containing gas in contact with an electrocatalytic anode comprising an $A_{1+x}B_{2-x}S_4$ thiospinel wherein A and B are metallic, $0<X<0.2$ and S is sulfur, thermally stable at cell operating temperatures of about 650° to about 1050° C.;
   passing $O_2$ containing gas in contact with a cathode comprising strontium doped lanthanum manganite forming ionic oxygen;
   passing said ionic oxygen from said cathode through an adjacent solid oxygen ion conducting electrolyte to said anode adjacent an opposite side of said solid electrolyte;
   oxidizing said $H_2S$ to S and $H_2O$ at said electrocatalytic anode.

2. A process according to claim 1 comprising withdrawing an electric current from said anode and cathode.

3. A process according to claim 1 wherein A is selected from the group consisting of Cu, Ni, Mn, Co, Fe, Zn, and mixtures thereof and B is different from A and is selected from the group consisting of Co, Ni, Fe, V, Ti, and mixtures thereof.

4. A process according to claim 1 wherein A is selected from the group consisting of Cu, Ni and mixtures thereof and B is different from A and is selected from the group consisting of Ni, Co, Fe and mixtures thereof.

5. A process according to claim 1 wherein said thiospinel is $CuFe_2S_4$.

6. A process according to claim 1 wherein said anode comprises a current collector comprising tungsten.

7. A process according to claim 1 wherein said solid electrolyte is selected from the group consisting of $ZrO_2$, $ThO_2$, $CeO_2$, $Bi_2O_3$ and mixtures thereof.

8. A process according to claim 1 wherein said solid electrolyte is $ZrO_2(8^{w/o}Y_2O_3)$.

9. A process according to claim 1 wherein said cathode is $La_{1-x}Sr_xMnO_3$ where $0.1<x<0.2$.

10. A process according to claim 1 wherein said cathode comprises a current collector selected from the group consisting of platinum, platinum alloys, magnesium doped lanthanum chromite, and electron conducting ceramics.

11. A process according to claim 1 wherein said cathode comprises a current collector selected from the group consisting of silicon carbide, titanium carbide, and niobium coped titanium dioxide.

12. A process according to claim 1 wherein said cell is operated at about 800° to about 1000° C.

13. A process according to claim 1 comprising withdrawing and separating said S and $H_2O$.

14. A process according to claim 1 comprising withdrawing an electric current from said anode and cathode wherein A is selected from the group consisting of Cu, Ni and mixtures thereof and B is selected from the group consisting of Ni, Co, Fe and mixtures thereof, said solid electrolyte is selected from the group consisting of $ZrO_2$, $ThO_2$, $CeO_2$, $Bi_2O_3$, and mixtures thereof, and said cell is operated at about 800° to about 1000° C.

15. A process according to claim 1 comprising withdrawing an electric current from said anode and cathode, said spinel is $CuFe_2S_4$, said anode comprises a current collector comprising tungsten, said solid electrolyte is $ZrO_2(8^{w/o}Y_2O_3)$, said cathode is $La_{1-x}Sr_xMnO_3$ where $0.1<x<0.2$, said cathode comprises a current collector selected from the group consisting of platinum, platinum alloys, magnesium doped lanthanum chromite, and electron conducting ceramics and said cell is operated at about 800° to about 1000° C.

16. A solid oxide fuel cell comprising an electrocatalytic anode comprising an $A_{1+x}B_{2-x}S_4$ thiospinel wherein A and B are metallic, $0<x<0.2$ and S is sulfur, thermally stable at cell operating temperatures of about 650° to about 1050° C. in contact with one side of solid oxygen ion conducting electrolyte, a cathode comprising strontium doped lanthanum manganite in contact with an opposite side of said solid electrolyte, means for passing $H_2S$ containing gas in contact with said anode, and means for passing $O_2$ containing gas in contact with said cathode.

17. A solid oxide fuel cell according to claim 16 comprising means for withdrawing an electric current from said anode and cathode.

18. A solid oxide fuel cell according to claim 16 wherein A is selected from the group consisting of Cu, Ni, Mn, Co, Fe, Zn, and mixtures thereof and B is different from A and is selected from the group consisting of Co, Ni, Fe, V, Ti, and mixtures thereof.

19. A solid oxide fuel cell according to claim 16 wherein A is selected from the group consisting of Cu, Ni and mixtures thereof and B is different from A and is selected from the group consisting of Ni, Co, Fe and mixtures thereof.

20. A solid oxide fuel cell according to claim 16 wherein said thiospinel is $CuFe_2S_4$.

21. A solid oxide fuel cell according to claim 16 wherein said anode comprises a current collector comprising tungsten.

22. A solid oxide fuel cell according to claim 16 wherein said solid electrolyte is selected from the group consisting of $ZrO_2$, $ThO_2$, $CeO_2$, $Bi_2O_3$, and mixtures thereof.

23. A solid oxide fuel cell according to claim 16 wherein said solid electrolyte is $ZrO_2(8^{w/o}Y_2O_3)$.

24. A solid oxide fuel cell according to claim 16 wherein said cathode is $La_{1-x}Sr_xMnO_3$ where $0.1<x<0.2$.

25. A solid oxide fuel cell according to claim 16 wherein said cathode comprises a current collector selected from the group consisting of platinum, platinum alloys, magnesium doped lanthanum chromite, and electron conducting ceramics.

26. A solid oxide fuel cell according to claim 16 wherein said cathode comprises a current collector selected from the group consisting of silicon carbide, titanium carbide, and niobium doped titanium dioxide.

27. A solid oxide fuel cell according to claim 16 additionally comprising means for withdrawing S and H$_2$O from said anode and means for separating withdrawn said S and H$_2$S.

28. A solid oxide fuel cell for electrochemical H$_2$S conversion, said fuel cell comprising the configuration: AB$_2$S$_4$thiospinel/ZrO$_2$(cubic form)/Sr doped lanthanum manganite.

29. In a solid oxide fuel cell for electrochemical H$_2$S conversion, an electrocatalytic anode comprising an A$_{1+x}$B$_{2-x}$S$_4$ thiospinel wherein A and B are metallic, $0<x<0.2$ and S is sulfur, thermally stable at cell operating temperatures of about 650° to about 1050° C.

* * * * *